United States Patent

Duran et al.

Patent Number: 5,044,644
Date of Patent: Sep. 3, 1991

[54] MOBILE CONTAINER SYSTEM WITH COMMON COVER FOR MULTIPLE CONTAINERS

[76] Inventors: Randy Duran; Michael Duran, both of 15 Garvey Dr., Jamesburg, N.J. 08831

[21] Appl. No.: 549,913

[22] Filed: Jul. 9, 1990

[51] Int. Cl.$^5$ .............................................. B62B 3/10
[52] U.S. Cl. .......................... 280/47.35; 280/47.371; 220/4.27; 220/23.2; 220/523; 211/71; 248/907
[58] Field of Search .............. 280/47.19, 47.24, 47.26, 280/47.34, 47.35, 47.371; 220/908, 909, 4.26, 4.27, 23.2, 23.4, 23.86, 23.83, 94 R, 520, 522, 523, 94 R; 211/71; 248/902, 907

[56] References Cited

U.S. PATENT DOCUMENTS

| | | | |
|---|---|---|---|
| 3,280,988 | 10/1966 | Bennett | 211/71 |
| 3,402,848 | 9/1968 | Busey | 280/47.26 |
| 4,357,029 | 11/1982 | Marini et al. | 280/47.19 |
| 4,821,903 | 4/1989 | Hayes | 280/47.26 |

*Primary Examiner*—Andres Kashnikow
*Assistant Examiner*—Richard Camby
*Attorney, Agent, or Firm*—Arthur L. Plevy

[57] ABSTRACT

A device for containing a plurality of individual refuse bins which includes a hollow base having substantially vertical front, back and side walls. The front wall has a height less than that of the back wall. A bottom support extends inwardly from the lower edge of the back, front and side walls for supporting the individual refuse bins within the base. A bin cover is hingedly connected to an upper edge of the back wall for simultaneously covering the tops of the plurality of refuse bins when in a first position and uncovering the tops of the refuse bins when in a second position. The bin cover is penetrated by a plurality of access ports matching the position and number of the plurality of refuse bins to allow refuse to be deposited in the bins when the cover is in the first position. At least one U-shaped strap lock staddles the base and pivotably attaches at the open end of the U-shaped lock to a pair of juxtaposed attachment point, one on the front wall and another on the back wall, each attachment point being exterior to the hollow of the base. When the lock is pivoted upwards, is captures the cover in a closed position, but when pivoted downwards, permits the cover to be opened.

5 Claims, 3 Drawing Sheets

MOBILE CONTAINER SYSTEM WITH COMMON COVER FOR MULTIPLE CONTAINERS

BACKGROUND OF THE INVENTION

1. Field of the Invention

The present invention relates to a container, and more particularly, to a container system for accommodating, transporting and covering a plurality of individual containers.

2. Description of the Prior Art

Refuse container systems for housing a plurality of individual refuse containers have been known for many years. U.S. Pat. No. 3,893,615 to Johnson entitled MULTIPLE COMPARTMENT REFUSE CONTAINER, issued July 8, 1975, for example, teaches a refuse container having a plurality of compartments, each having a hinged lid to gain access to the compartment from the top and a side door for gaining access to the bottom of the individual compartments. Each compartment is provided with a wire frame extending from the interior walls of the compartment upon which a garbage bag can be hung. Conventional garbage cans can be used in place of the garbage bags. Trash is introduced by lifting the lid to a compartment and depositing the trash therein. Full bags or cans are withdrawn from the receptacle through the side doors. U.S. Pat. No. 4,821,903 to Hayes entitled TRASH BIN CART AND BIN ASSEMBLY issued Apr. 18, 1989, discloses a tubular metal cart for accommodating a plurality of individual trash bins thereon. The cart includes a hinged lid for simultaneously covering a plurality of trash bins stored on the cart and has a set of wheels for rolling the cart when it is tilted back to displace the weight of the trash bins onto the wheels. Known trash receptacle systems, however, do not provide a base for holding a plurality of trash bins, such that they are securely held on the base when it is being moved, or when the lid is up. Known systems have lid locking mechanisms, which are inconvenient to use, and pull handles which are statically positioned, and do not accommodate persons of different height or, like those taught in the patent to Hayes, cause the mover to bear a substantial portion of the weight of the receptacle when it is moved.

SUMMARY OF THE INVENTION

The problems and disadvantages associated with the conventional techniques and devices utilized to contain refuse, are overcome by the present invention, which includes a refuse containment apparatus having the capacity to contain a plurality of individual refuse bins. The apparatus includes a hollow base having substantially vertical front, back and side walls. The front wall has a height less than that of the back wall. Side walls connect the back wall to the front wall and a bottom support extends inwardly from the lower edge of the front and back walls, for supporting the individual refuse bins within the base. A bin cover is hingedly connected to an upper edge of the back wall, for simultaneously covering the tops of the plurality of refuse bins when in a first position, and uncovering the tops of the refuse bins, when in a second position. The bin cover is penetrated by a plurality of access ports matching the position and number of the plurality of refuse bins, to allow refuse to be deposited in the bins when the cover is in the first position. At least one U-shaped strap lock straddles the base and pivotably attaches at the open end of the U-shaped lock to a pair of juxtaposed attachment points, one on the front wall and another on the back wall; each attachment point being exterior to the hollow of the base. When the lock is pivoted upwards, it captures the cover in a closed position, but when pivoted downwards, permits the cover to be opened.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
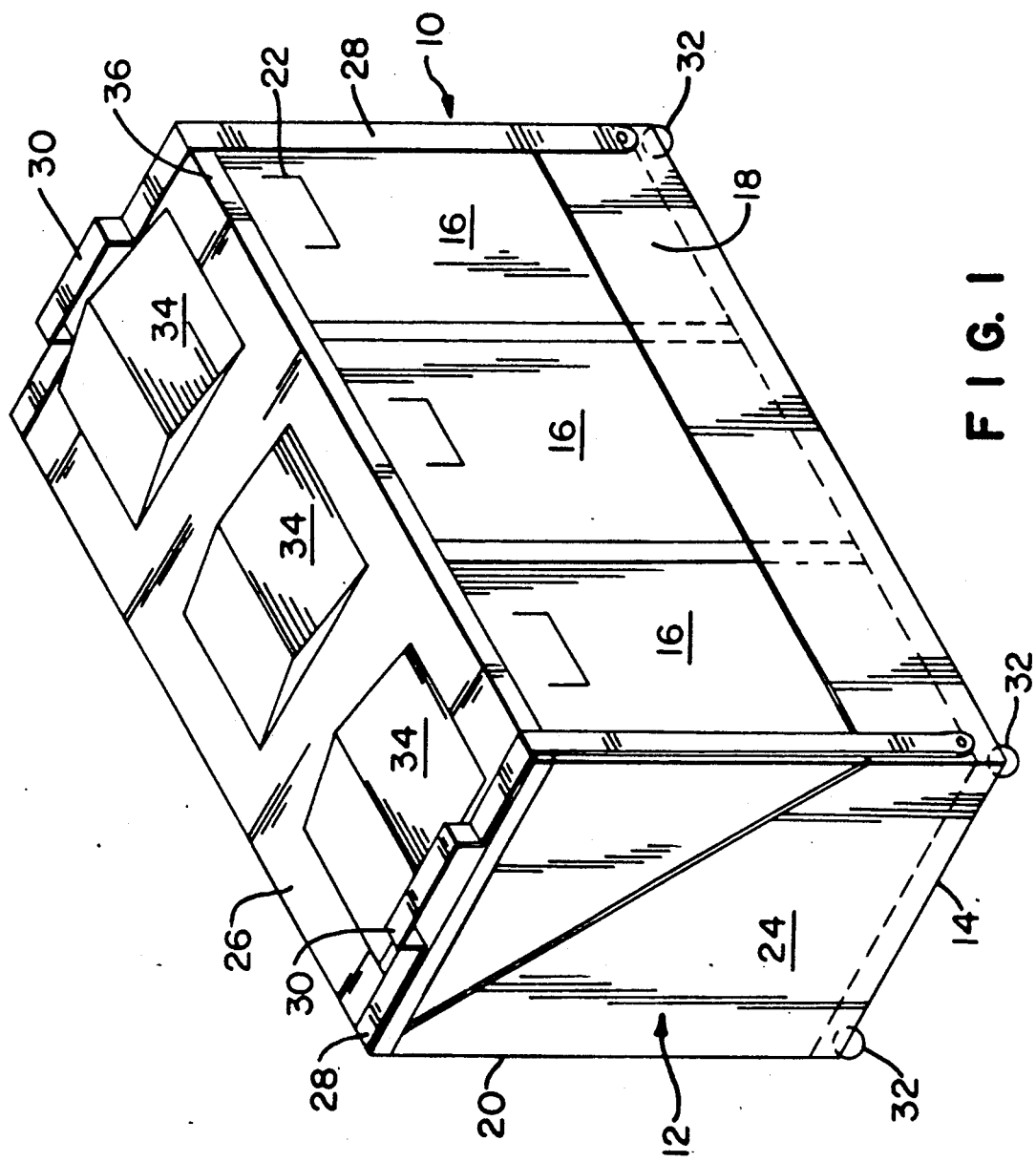
FIG. 1 is a perspective view of a refuse container system in accordance with an exemplary embodiment of the present invention.

FIG. 1 shows a refuse container system 10 having a hollow base 12 preferably constructed of sheet metal. The base 12 has a bottom 14 for supporting a plurality of trash bins 16. The bottom 14 is preferably solid, but could also be an inwardly directed flange extending from the walls of the base. The base 12 has a front wall 18, which is substantially shorter than the rear wall 20, to allow the trash bins 16 to be removed more easily from the system 10. Each trash bin 16 has a front mounted handle 22 and a rear handle located on the rear opposite the front handle (not shown), to further aid removal. Sidewalls 24 slope downwardly to connect the rear wall 20 to the smaller front wall 18. A bin cover 26 is hingedly connected along one edge to the upper edge of the rear wall 20. A pair of pivotable cover lock loops 28 secure the bin cover in a closed position. The lock loops 28 each have a handle portion 30, which assists in positioning the loops in either a closed or a locked position and may be used to pull the system 10 as it rolls upon a set of wheels or casters, as shall be further described below. The bin cover 26 has a plurality of tipping flap lids 34, matching the plurality of trash bins 16 for introducing trash into the bins 16. The flap lids 34 may be prismatic in side view and pivot at an axis within the plane of the bin cover 26, or the bin cover 26 may have triangular projections for supporting a bent plate-like flap lid 34. The bin cover 26 and the flap lids 34 are preferably manufactured from a tough polymeric material, but could as well be formed from sheet metal. The bin cover 26 has a sealing lip 36 which runs about the periphery of the cover to assist in firm retention of the trash bins and to help keep odors contained within the trash bins. As seen, the base has four casters 32 which may be the type employing universal motion, or may be hidden casters to further enforce mobility, while providing an improved aesthetic appearance.

Figure 2:
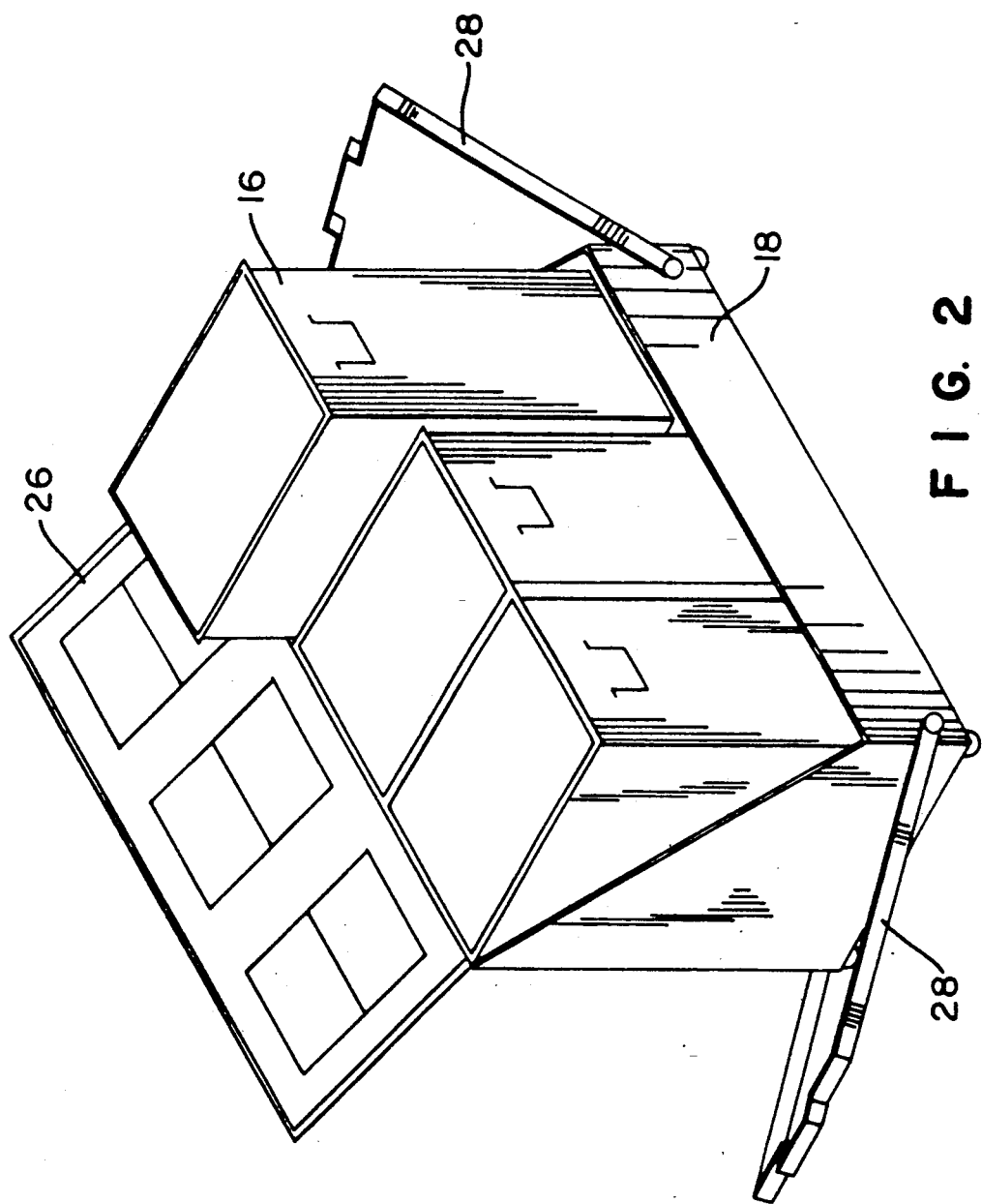
FIG. 2 is a partially exploded perspective view of the refuse container system shown in FIG. 1, showing the lid locking means unlocked, the lid open, and an individual refuse container projected out of the base of the unit.

Referring now to FIG. 2, the operation of the respective components of the system can be more fully appreciated. When it is desired that a trash bin 16 be emptied, the lock loops 28 are pivoted down from their position overlying the bin cover 26. The bin cover 26 can then be pivoted back to allow the trash bins 16 to be removed by lifting them to a height where they clear the front wall 18.

Figure 3:
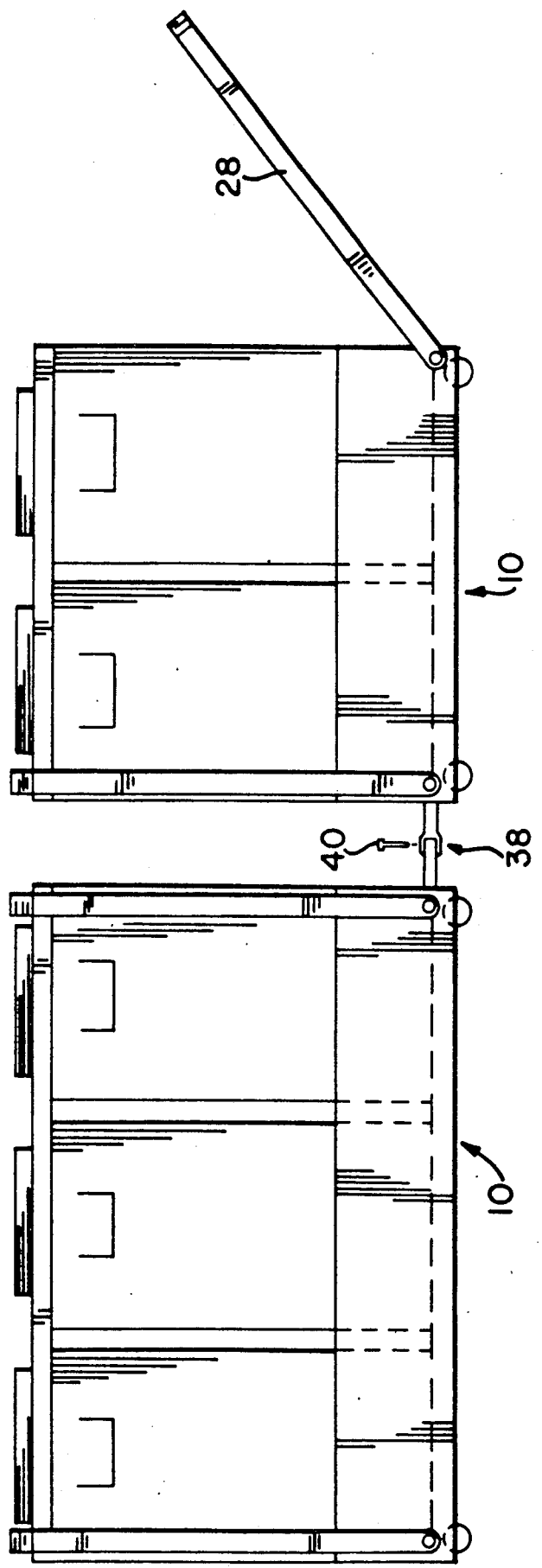
FIG. 3 is a side view in elevation of a pair of refuse container systems in accordance with an exemplary embodiment of the present invention, linked together by a removeable link for simultaneous transport.

FIG. 3 shows two refuse container system units linked by an articulated coupling 38, held together by a removeable link pin 40. The locking loop 28 when pivoted downward, serves as a convenient handle for pulling the refuse container systems 10, either singly or when linked together as a group. The locking loop 28, when used for this purpose, automatically adjusts to the height of the person pulling the load. It is, of course, understood that additional units such as three or more can be attached in a similar manner. The coupling 38 can of many different configurations, suitable for accomplishing the intended task.

It should be apparent from the aforegoing description, that the present invention provides a refuse receptacle system which holds a plurality of trash bins securely on a base, even when being moved or when the cover to the receptacle is open. The present invention also provides a cover lock which is easy to use, and which can be used as a pull handle which automatically adjusts to the height of the user.

While the above description indicated a primary use involving the separation of refuse, it will be understood that the unit can be employed for multiple functions as accommodating many different items which may or may not require separation such as clothing, food products, hooks, etc.

It should be understood that the embodiments described herein, are merely exemplary, and that a person skilled in the art may make many variations and modifications without departing from the spirit and scope of the invention, as defined in the appended claims.

We claim:

1. A refuse containment apparatus having the capacity to contain a plurality of individual refuse bins comprising:
   (a) a hollow base having a substantially vertical back wall, a front wall substantially parallel to said back wall and having a height less than that of said back wall, side walls connecting said back wall to said front wall, and bottom support means extending inwardly from a lower edge of said front and back walls for supporting said individual refuse bins within said base;
   (b) a bin cover hingedly connected to an upper edge of said back wall for simultaneously covering the tops of said plurality of refuse bins when in a first position and uncovering the tops of said refuse bins when in a second position, said bin cover penetrated by a plurality of access ports matching in position and number said plurality of refuse bins to allow refuse to be deposited in said bins when said cover is in said first position;
   (c) at least one U-shaped strap lock straddling said base and pivotably attached thereto at the open end of said U-shaped lock to a pair of juxtaposed attachment points, one on said front wall and another on said back wall, each said attachment point being exterior to said hollow of said base, such that said lock, when pivoted upwards captures said cover in a closed position, and when pivoted downward, permits said cover to be opened.

2. The refuse containment apparatus of claim 1, wherein said base is supported above floor level by casters which permit said refuse containment apparatus to be moved by the rolling of said casters and wherein said strap locks have a hand grip portion adapted to be grasped by the hand of a user whereby said strap lock can be pivoted down and used as a handle for pulling said refuse containment apparatus.

3. The refuse containment apparatus of claim 1, wherein said bin cover has a downwardly directed peripheral lip to assist in the retention of said bins in said refuse containment apparatus and to assist in retaining odors under said cover, and wherein said bin cover further includes a plurality of flaps for covering said access ports, each of said flaps pivotally retained within an associated said access port to permit said flap to be rotated to expose a respective said access port to allow refuse to be deposited therethrough.

4. The refuse containment apparatus of claim 2, wherein said base includes linkage means for linking said refuse containment apparatus to another like apparatus such that more than one of said refuse containment apparatus can be moved simultaneously, said linkage being articulated to permit said refuse containment apparatus to be positioned at a range of angular displacements relative to said another refuse containment apparatus.

5. The refuse containment apparatus of claim 4, wherein said articulated linkage is formed by a female hinge member affixed to a first said refuse containment apparatus and a male hinge member affixed to a second refuse containment apparatus, said female hinge member mating with said male hinge member, said mating hinge members held together by a removeable link pin.

* * * * *